United States Patent
Bunel et al.

(10) Patent No.: US 11,085,640 B2
(45) Date of Patent: Aug. 10, 2021

(54) PRODUCTION OF A COMBUSTION CHAMBER MADE OF COMPOSITE MATERIAL

(71) Applicant: Safran Aircraft Engines, Paris (FR)

(72) Inventors: Jacques Marcel Arthur Bunel, Moissy-Cramayel (FR); William Louis Rodolphe Dousse, Moissy-Cramayel (FR); Dan Ranjiv Joory, Moissy-Cramayel (FR); Benjamin Frantz Karl Villenave, Moissy-Cramayel (FR)

(73) Assignee: Sanfran Aircraft Engines, Paris (FR)

( * ) Notice: Subject to any disclaimer, the term of this patent is extended or adjusted under 35 U.S.C. 154(b) by 89 days.

(21) Appl. No.: 16/521,292

(22) Filed: Jul. 24, 2019

(65) Prior Publication Data
US 2020/0103111 A1    Apr. 2, 2020

(30) Foreign Application Priority Data
Jul. 25, 2018 (FR) ...................... 1856918

(51) Int. Cl.
*F23R 3/00* (2006.01)
*B29C 33/48* (2006.01)

(52) U.S. Cl.
CPC ............ *F23R 3/002* (2013.01); *B29C 33/485* (2013.01); *F23R 2900/00018* (2013.01)

(58) Field of Classification Search
CPC ..... B29C 33/301; B29C 70/32; B29C 33/485; F23R 2900/00018; F23R 3/007
See application file for complete search history.

(56) References Cited

U.S. PATENT DOCUMENTS

| | | | |
|---|---|---|---|
| 4,416,621 A * | 11/1983 | Huther | F23R 3/007 110/336 |
| 5,965,266 A | 10/1999 | Goujard et al. | |
| 6,068,930 A | 5/2000 | Lamouroux et al. | |
| 6,291,058 B1 | 9/2001 | Goujard et al. | |
| 7,125,237 B2 * | 10/2006 | Buge | B29C 53/824 425/182 |

(Continued)

FOREIGN PATENT DOCUMENTS

| | | |
|---|---|---|
| EP | 1 227 071 A2 | 7/2002 |
| EP | 1 816 399 A1 | 8/2007 |

(Continued)

OTHER PUBLICATIONS

EP-3162523-B1 Machine Translation (Year: 2018).*

*Primary Examiner* — Jacob J Cigna
*Assistant Examiner* — Michael W Hotchkiss
(74) *Attorney, Agent, or Firm* — Blank Rome LLP (57) ABSTRACT

A method for producing an annular combustion chamber of a turbojet using CMC. For this, a shaping tool with movable slides is used and said chamber is produced around the tool, thereby producing a fibrous preform of which the shape is consolidated by drape moulding on the tool and pyrolysis, which is then densified by CVI. Several slides have back drafts, at least one other of such slides having a draft or neither a draft nor a back draft. Then, the slides are removed in a predetermined order imposed by the back drafts and the relative positions of the slides.

18 Claims, 5 Drawing Sheets

(56) References Cited

U.S. PATENT DOCUMENTS

| | | | | |
|---|---|---|---|---|
| 7,640,961 B2* | 1/2010 | Stubner | ................ | B29C 33/485 |
| | | | | 156/443 |
| 7,707,708 B2* | 5/2010 | Douglas | ................ | F02C 7/045 |
| | | | | 29/718 |
| 8,025,499 B2* | 9/2011 | Hubert | ................ | B29C 70/54 |
| | | | | 425/470 |
| 8,382,467 B2* | 2/2013 | Micheaux | ................ | B29C 33/38 |
| | | | | 425/403 |
| 9,144,949 B2* | 9/2015 | Ender | ................ | B29C 33/485 |
| 9,975,299 B2* | 5/2018 | Bennett | ................ | B29C 70/54 |
| 10,226,899 B2* | 3/2019 | McMillan | ................ | B29C 33/046 |
| 2006/0225265 A1* | 10/2006 | Burnett | ................ | B21D 53/92 |
| | | | | 29/448 |
| 2010/0109208 A1* | 5/2010 | Hubert | ................ | B29C 33/48 |
| | | | | 264/571 |
| 2017/0370583 A1* | 12/2017 | Marusko | ................ | F23R 3/002 |

FOREIGN PATENT DOCUMENTS

| | | | |
|---|---|---|---|
| EP | 1 851 180 | 11/2007 | |
| EP | 3162523 B1 * | 9/2018 | ............ B29C 53/82 |
| FR | 2 934 014 A1 | 1/2010 | |
| FR | 2 936 517 A1 | 4/2010 | |
| JP | S61-279336 A | 12/1986 | |
| WO | WO 2006/090087 A1 | 8/2006 | |
| WO | WO 2010/034937 A2 | 4/2010 | |

* cited by examiner

PRODUCTION OF A COMBUSTION CHAMBER MADE OF COMPOSITE MATERIAL

This application claims priority to French patent application no. 1856918, filed Jul. 25, 2018, the entirety of which is incorporated by reference herein.

TECHNICAL FIELD

The present invention relates to producing (viz. manufacturing) at least a part of a combustion chamber made of composite material and, in particular, to such a method for manufacturing at least a part of an annular combustion chamber of a gas turbine engine for an aircraft.

BACKGROUND

It is currently known to reinforce materials by incorporating a fibrous reinforcement in their matrix, thus increasing their mechanical strength. Very-high-strength fibres, textures and matrices resulting in high performance, lightweight, competitive, durable composites have been developed. Among these, thermostructural composites based on ceramic or carbon matrices and fibres meet the needs of thermal mechanics: which must still operate at temperatures higher than 1000° C. They are more refractory and lighter than metals and less fragile than monolithic ceramic or carbon.

It is also known how to control their production. EP1851180 and WO2010034937 provide two examples of this.

Manufacturing at least a part of the combustion chambers of the aforementioned turbine engines is also well known. EP1816399 provides an example of this. It is thus proposed to separately produce two sub-assemblies of shrouds forming the combustion chamber, with edge-to-edge welding of the shrouds, by welding an intermediate connecting ring to one end of a first sub-assembly, having a mounting surface, coupling one end of a second sub-assembly with this surface and welding it to said intermediate ring. Solutions assembled by bolting also exist.

The production of such a combustion chamber made of composite material does not appear to have been contemplated before now, in particular the production of such an annular combustion chamber made of thermostructural composite material of a gas turbine engine for an aircraft.

This is conceivable, since the combustion chamber is a structure that is subject to very severe mechanical and thermal stress. In addition, the shape of such a hollow ring-shaped part, which is typically substantially drop-shaped in cross-section across its elongation direction, is considered to prompt the use of known moulded/welded solutions and therefore to diverge from moulding with composite material.

SUMMARY

However, the invention proposes precisely the combination of thermostructural composite material and annular combustion chamber.

More specifically, it proposes a method for manufacturing at least a part of an annular combustion chamber made of thermostructural composite material, the combustion chamber comprising a bottom extending between inner and outer walls, and forming a one-piece assembly with same, the method being characterised in that it comprises steps wherein:

a) a shaping tool with slides comprising a plurality of such movable slides is manufactured, b) said at least a part of the combustion chamber is manufactured around the shaping tool, said at least a part of the combustion chamber manufactured having, at an end opposite the bottom wall, an opening defining a gas outlet and having a narrower section than other inner sections of said at least a part of the combustion chamber, c) then said slides of the shaping tool are removed from the hollow interior of said at least a part of the combustion chamber, in a predetermined order imposed by the relative positions of the slides.—producing a shaping tool with slides comprising a plurality of such movable slides.

Advantageously, or preferably, it need be:

step b) will comprise manufacturing producing for this purpose a fibrous preform, which can be formed of yarns or cords, and of which the shape is consolidated, and then densified by chemical vapour infiltration, the consolidation possibly carries out by drape moulding on and around said shaping tool, by impregnating the yarns or cords of the fibrous preform with a consolidating composition containing a carbon or ceramic precursor and by transforming the carbon or ceramic precursor by pyrolysis, so as to obtain such at least a part of the combustion chamber with a hollow interior, and/or said at least a part of the combustion chamber, as manufactured, will possibly have at one end an opening defining a gas outlet and having a section that will be narrower than other inner sections of the combustion chamber, so that several of said slides of the tool will have back drafts, and/or at least one other of said slides will have a draft or neither a draft nor a back draft, and/or then said slides of the shaping tool will advantageously be removed from the hollow interior of the combustion chamber, in a predetermined order imposed by the relative positions of the slides and back drafts.

Thus, transposing the production (or manufacture) of the so-called part made of thermostructural composite material to the field of combustion chambers paves the way for the production of such structurally efficient one-piece parts, potentially with zones of variable thickness (which can be produced, in particular, during drape moulding) and the advantages inherent in thermostructural composites.

To extract the slides, it is proposed that the step of removing said slides from the hollow interior of said at least a part of the combustion chamber should comprise an outward movement of these slides through the opening of said at least a part of the combustion chamber.

Thus, it is not necessarily required to open the produced wall of the preform at the side and/or bottom in order to extract the slides via same.

At least some of the movable slides are able to extend by sectors about an axis of the preform or said at least a part of the combustion chamber.

Thus, the production and both the placement and the removal of these slides are made even easier. Effects in terms of mechanical and/or thermal stress can also be expected.

In connection with the above, the invention likewise proposes:

for said slides with back drafts to be sectored, and/or during the step of removing said slides from the hollow interior of said at least a part of the combustion chamber, for all the slides to move through said opening.

Increase sensitivity of the aforementioned effects is expected from this.

In addition, at least one slide, with a smaller section than the section of the opening, can extend in a straight line along an axis parallel to an axis of said at least a part of the combustion chamber and can be movable perpendicularly to a plane in which the opening extends.

Thus, the at least one slide is then surrounded externally and internally by other slides.

The at least one slide may extend from a bottom of the tool, intended for forming an annular bottom wall of the burner/furnace of said at least a part of the combustion chamber, to at least the opening.

The slide can also extend beyond the opening so that it can be grasped and thus to facilitate its removal from said at least a part of the combustion chamber.

The at least one slide can then be the first to be removed in step c).

Once this straight slide is removed, the other slides of the tool are removed one-by-one through the opening of said at least a part of the combustion chamber. The other slides may have a radial section, i.e. radial about the axis of said at least a part of the combustion chamber, that is smaller than the section of the opening of said at least a part of the combustion chamber.

Using the aforementioned method, it is also possible to produce/manufacture said shaping tool in metal. This is an economic solution that allows precision manufacturing and possibly complex shapes.

The thermostructural composite material may be, in particular, CMC (ceramic matrix composite).

In addition, it turns out that the solution adopted makes it possible to produce said at least a part of the combustion chamber on and around the shaping tool, exclusively, without any other shaping piece being arranged around the fibrous preform.

Thus, the counter-moulds mentioned in EP1851180 and WO2010034937 are no longer required.

It is also no longer necessary to maintain the final preform obtained in shape in a tool forming a mould into which a desired amount of liquid precursor is injected, or to maintain the fibrous preform in the desired shape on the shaping tool member by a membrane made of elastomer, for example, forming a counter-mould and applied to the outer surface of the preform.

The invention makes it possible, in a relatively simple manner, to obtain a one-piece solution, with an open (downstream) end for the gas outlet and a closed (upstream) bottom, which can moreover integrate multiple complementary openings for the inlet of combustion air and for mounting fuel-injection devices to carry the required fuel/oxidiser mixture to the inlet of the combustion chamber. In addition, with such a one-piece bottom with said inner and outer walls, it is possible to produce an integrated deflector, thus thermally protecting the combustion chamber, a conventional "chamber bottom" (CB) being able to be arranged even further upstream, opposite said "one-piece bottom".

If need be, the invention will be even better understood, and other details, features and advantages of the invention will appear upon reading the following description given by way of a non-restrictive example while referring to the appended drawings wherein:

BRIEF DESCRIPTION OF THE FIGURES

in a view like FIG. 2.

DETAILED DESCRIPTION

Figure 1:
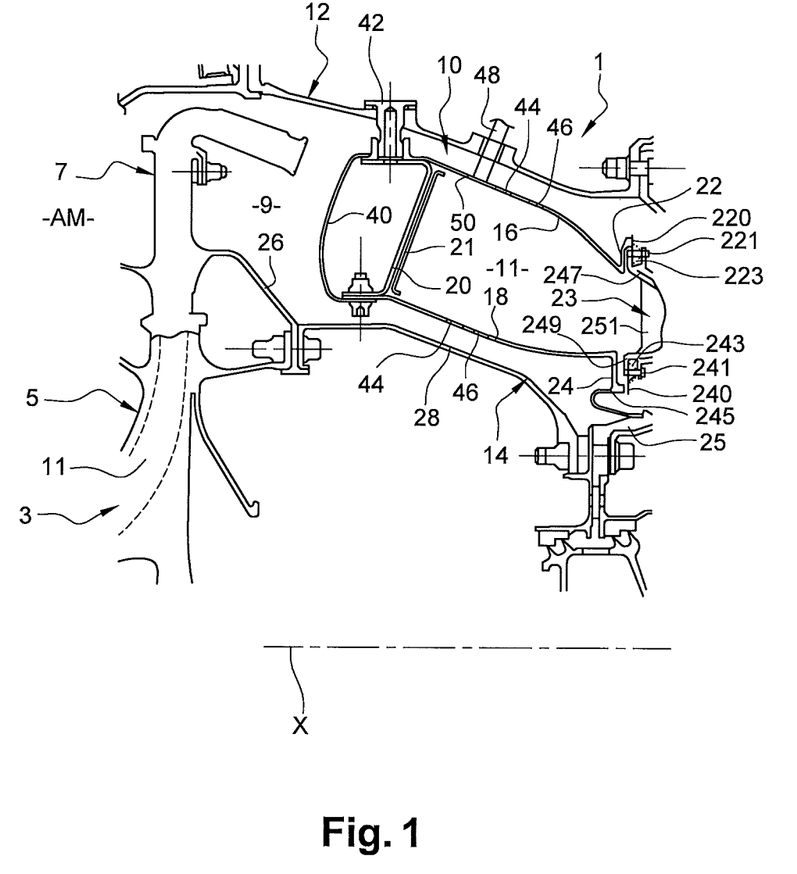
FIG. 1 is a schematic half-view in axial section of a turbine engine "combustion module", comprising a combustion chamber of the prior art.

In the embodiment of FIG. 1, the portion 1 of a gas turbine engine for an aircraft (in this case a twin-spool turbofan) comprises a compressor 3—which can be a high-pressure compressor arranged axially following a low-pressure compressor—whose downstream part (visible in the figure) comprises a centrifugal stage 5, an annular diffuser 7 connected downstream of the compressor 3. The diffuser 7 leads into a space 9 surrounding an annular combustion chamber 10. The space 9 is delimited by an outer casing 12 and an inner casing 14, both annular and coaxial with the X axis of the turbine engine. The combustion chamber 10 is held downstream by clamps. Said portion 1 of the turbine engine can be referred to as "combustion module".

In this case, the compressor 3 is centrifugal and comprises a rotary impeller 11 designed to accelerate the air that passes through it and, thereby, to increase the kinetic energy of this air. The compressed air injected into the combustion chamber 10 is mixed with fuel from injectors, such as the injectors 4" of FIG. 2. The gases from the combustion are directed towards a turbine (in this case high pressure) located downstream (AV) of the outlet of the chamber 10, and first to a distributor 23 which is a part of the stator of the turbine engine.

The diffuser 7 surrounds the impeller in an annular fashion. The diffuser 7 serves to reduce the speed of the air exiting the impeller and, thereby, to increase its static pressure.

The chamber 10 comprises an outer wall of revolution 16 and an inner wall of revolution 18, made of metal, connected upstream to an annular transverse wall 20, or chamber bottom wall. By means of (radially) outer 22 and inner 24 annular flanges, at the downstream end, the chamber 10 is resting axially against outer and inner shrouds of a distributor, in this case the high-pressure distributor 23, via sealing strips 220, 240 bonded to said (radially) outer and inner annular flanges 24. These flanges rest axially against axial pins 221, 241 with which the outer 247 and inner 249 annular shrouds are equipped, and which can be centred by springs 223, 243. Like the outer annular flange may do externally, the radially inner annular flange 24 is extended radially inwards with respect to the sealing strips 240 by a hairpin-shaped annular support member 245 open in the downstream direction, which rests against a casing 25, referred to as HP distributor support casing. Substantially radial blades 251 extend between the outer and inner annular shrouds of the distributor 23, which is moreover secured.

The inner casing 14 which runs along the chamber 10 can also be considered to be defined by, or to comprise, the shroud 26 of the diffuser and an inner intermediate web 28 secured by the upstream side to the shroud 26 and by the downstream side to the casing 25.

In the example of FIG. 1, the combustion chamber 10, of which the downstream end is positioned as indicated above, is moreover secured in the upstream portion (AM) by at least three securing pins 42 distributed circumferentially about the longitudinal axis X of the turbine engine, axis about which the mobile turbine and compressor blades, in particular, rotate.

In the present application, the radial aspect can be appreciated with respect to the axes X and I-I', the axial aspect thus being appreciated in reference to one or the other of these same axes, the axis of revolution of the combustion chamber in turn being parallel to (coinciding with) the longitudinal axis X of the turbine engine. In relation to this point, the expressions outer/external inner/internal should be understood to refer to the radial direction.

The pins 42 are secured to the outer casing 12 and at least to the walls 16, 20 secured together. There are preferably four such pins 42 distributed uniformly about the X axis.

While the section of FIG. 1 does not show a fuel-injection device (which is, however, provided), it does show a cover 40 which can be annular and curved in the upstream direction. The cover 40 is secured to the upstream ends of the walls 16, 18 and 20 of the chamber. According to another circumferentially offset section which passes through the axis of one of these fuel-injection devices, as in FIG. 2, the cover 40 can be seen to comprise ports for the passage of air (reference 41", FIG. 2) and for said fuel-injection device, aligned with other passage ports formed through the chamber bottom wall 20 and a deflector 21 (replacing the previous ring of deflectors) arranged immediately downstream of same, for protecting it thermally against the radiation from the flames that develop in the burner 11 of the combustion chamber 10.

The mixture of air and fuel injected into the burner 11 (also called furnace—space within which the combustion occurs) is ignited by means of at least one spark plug 48 which extends radially out of the combustion chamber. The spark plug is guided at its radially inner end into a port 50 of the outer wall of the chamber. Made of metal, the outer 16 and inner 18 walls are crossed by primary holes and dilution holes 44, 46.

Figure 2:
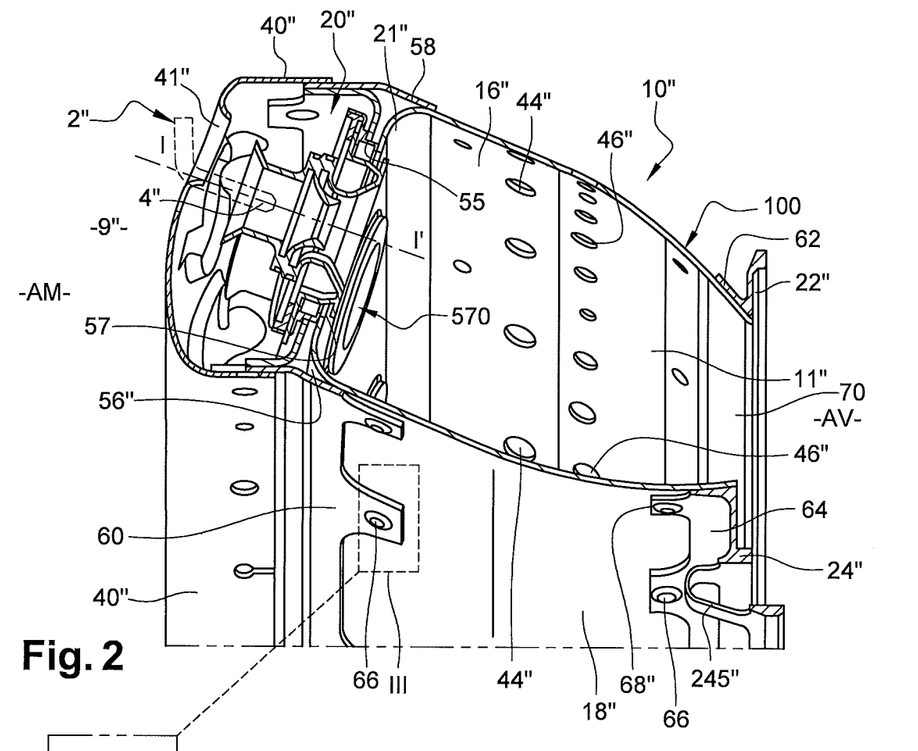
FIG. 2 is a view, angularly offset with respect to FIG. 1 and also in perspective, of an embodiment of a combustion chamber according to the invention.

In particular in order to improve the useful life of the combustion chamber and/or to reduce parasitic gas leaks in the area of the equipped CB and/or to better control the overall mass of the combustion chamber, FIG. 2 shows a combustion chamber solution (10") in which said inner (16") and outer (18") walls and the deflector/bottom (21")—arranged downstream of the CB wall (20") to thermally protect same—are produced so that together they form a one-piece assembly (100), where identical means or means that perform the same function as those of FIG. 1 have the same references, with the exponent".

The one-piece assembly 100 is made of refractory, thermostructural composite material. This can be CMC.

The CB 20" is made of metal. Its thickness may be greater than or equal to that of the one-piece assembly 100, and thus be part of the mechanical structure of the combustion chamber.

The name CB (chamber bottom) for the element 20" comes from the fact that it supports the injection system 2", which is secured to it, as is usually the case. As for the so-called "deflector" part 21", it is also named in reference to the usual consideration of that which is located in front of (directly downstream of) the "chamber bottom" having the function of thermally protecting it from the heat of the burner. In the invention, the "deflector" 21" is thus made up of the bottom of the one-piece assembly 100 and defines the burner bottom 11" where combustion takes place. Thus, the one-piece assembly 100 and the burner 11" are defined and delimited by the inner 18" and outer 16" annular walls, respectively, joined to form one piece by the "deflector", which can also be called "burner bottom", 21". During operation, when supplied with oxidant and fuel, the burner 11" contains the combustion induced by the spark plugs, the combustion gases exiting through the opening 70 located, in a direction parallel to the I-I' axes, opposite the burner bottom 21".

Following each I-I' axis, the corresponding injection system 2" passes through a first port 55 (of a circumferential series of such ports) of the CB 20", in a relatively tight manner. Then, without contact, through a second port 57 (of a circumferential series 570 of such ports) of the burner bottom 21".

(In particular) with the aim of suppressing air leaks in the space 56" between the CB 20" and the burner bottom 21" of the one-piece assembly, the bottom 21" here is completely solid, except at the ports 57. The bottom 21" is thus devoid of conventional multi-perforation ports for the passage of cooling air along the outer 16" and/or inner 18" walls. Conversely, the outer 16" and inner 18" walls can have primary holes and dilution holes 44", 46" passing through same.

Furthermore, the production of the one-piece assembly 100 using thermostructural composite material may allow the chamber bottom 20", with the exception of said first ports 55 for mounting fuel-injection devices 2"/4", to be completely solid, thus being devoid of the ports for the passage of cooling air (multi-perforations) towards the burner bottom 21".

Since the burner bottom 21" is made as one piece, the CB 20" is favourably a ring comprising a circumferential succession of sectors (ring sectors).

For a link subject to stress (mechanical/thermal) and controlled production between the one-piece assembly 100 and the metal parts surrounding the turbine engine (if they exist: pins 42, plates 220, 240, etc.), it is proposed for first inner 60 and outer 58 connecting metal walls to be provided towards the upstream end of the combustion chamber 100, interconnecting the metal shroud 40" (extending upstream of the chamber bottom 20") and the inner 18" and outer 16" walls, respectively; see FIG. 2.

In addition, second inner 64 and outer 62 metal connecting walls (see FIG. 2), having inner 24" and outer 22" flanges, respectively, are provided towards the downstream end of said chamber:

between the inner wall 18" and:
the injector housing (reference 25, FIG. 1, via a possible hairpin portion 245") and/or the inner annular shroud 249 (FIG. 1), or
an intermediate inner web (reference 28, FIG. 1), and
between said outer wall 16" and a portion of the DHP (outer annular shroud 247, FIG. 1) and/or the outer casing (reference 12, FIG. 1), in particular a zone for clamping on this outer casing.

The metal connecting walls 58, 60, 62, 64 are therefore flexible sheets, which are more deformable than the refractory material of the assembly 100, when the turbine engine is operational.

Figure 4:
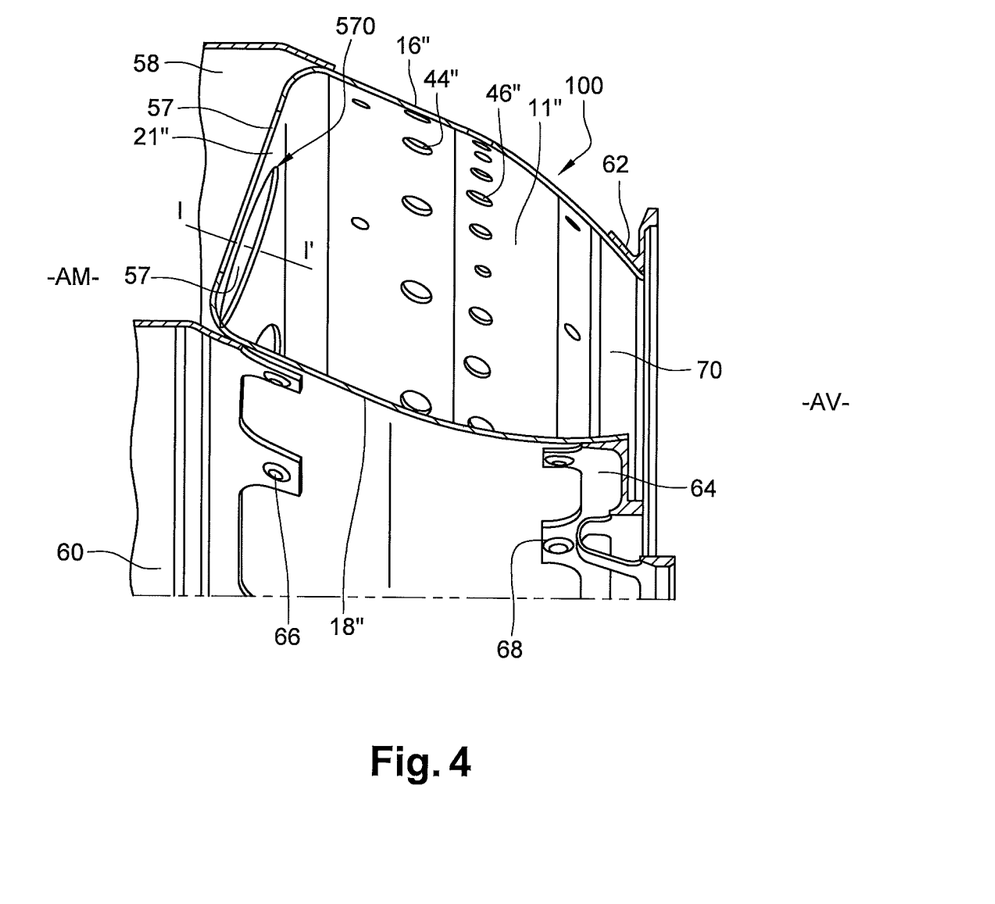
FIG. 4 shows the only combustion chamber to which only four metal connecting walls are secured (58, 60, 62, 64 below)

In view of the foregoing, FIG. 4 is thus understood to illustrate, taken from FIG. 2, the one-piece assembly 100 (outer wall 16" and inner wall 18", and burner bottom 21")

which defines the burner 11" with a downstream gas outlet opening 70 which is sought to be produced herein.

Figure 3:
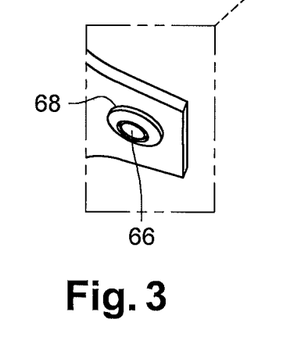
FIG. 3 is an enlarged view of the area marked III in FIG. 2.

Once that has been done, said inner 18" and outer 16" walls of the one-piece assembly 100 and the inner 60, 64 and outer 58,62 metal connecting walls, respectively, are secured, preferably using pins 66 (passing through facing adjacent walls) and washers 68 welded together in order to limit the thermal and mechanical constraints; see FIGS. 2 and 3.

One challenge identified was therefore to produce the one-piece annular combustion chamber 100 using thermostructural composite material.

In the preferred example, since it has an elongation at break of up to 1%, extreme resistance to thermal shock, good resistance to dynamic loads and anisotropic properties defined by the orientation of the fibres, the thermostructural composite material is CMC.

Thus, in order to produce the outer 16" and inner 18" walls, and the burner bottom 21" as single pieces:
the shaping tool with slides 200 is produced first,
then, the one-piece combustion chamber 100 is produced around this tool 200, using the preform 110.

The shaping tool with slides 200 ("sliding split mould") comprises several slides 210 joined together to form a compact block.

The tool 200 is preferably made of metal, for reasons of cost and ease of production.

Figure 5:
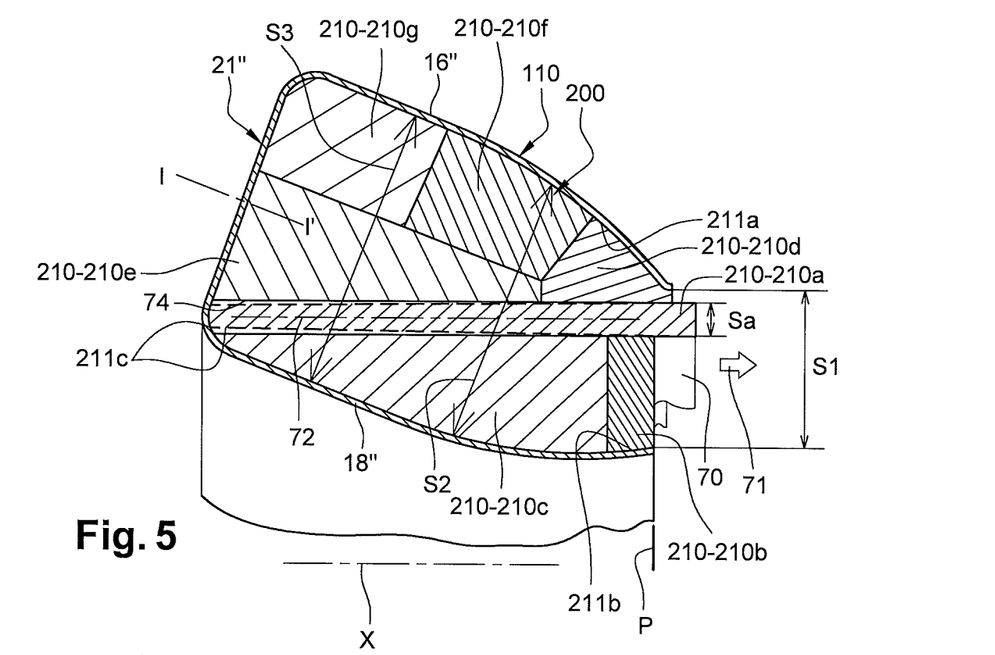
FIGS. 5-6 are two views, section and perspective, of the preform around the shaping tool, the section of FIG. 5 passing through the plane V-V of FIG. 6.
Figure 6:
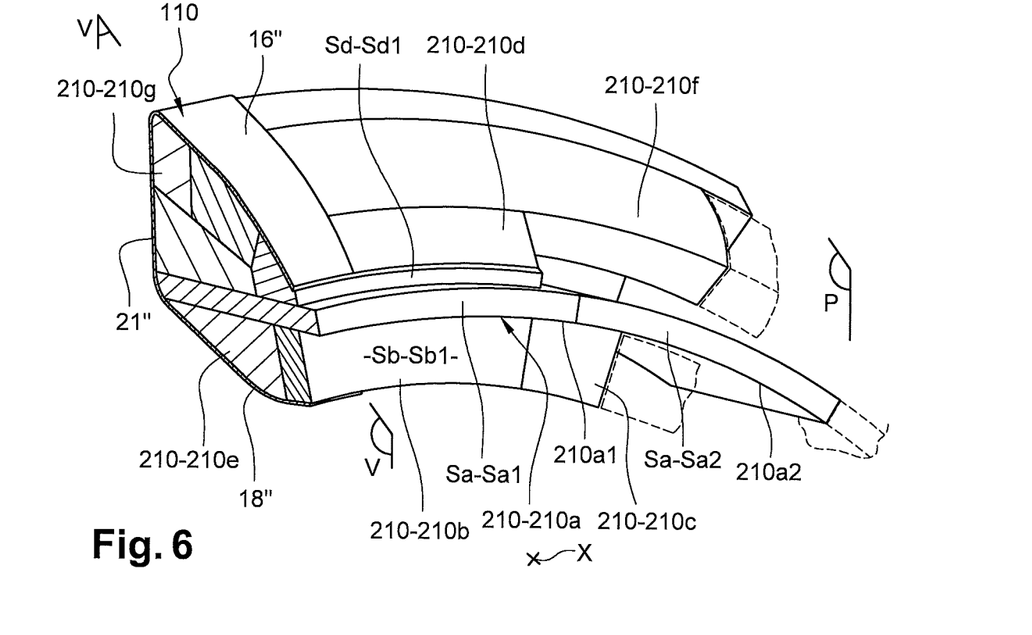

In the non-limiting example shown in FIGS. 5 and 6, all the slides 210 are movable. There are seven in the example.

Some of them could have been removed through side ports, such as the holes 44" and/or 46", which would have been formed by additional slides 210, projecting from the outside surface of the assembled block.

The preferred option was for the slides 210 to be removed from the hollow interior of the chamber 100, once it had been produced, by moving—in this case sliding—all the slides 210 towards the outside through the opening 70; see arrow 71, FIG. 5.

This opening 70 (gas outlet) has a section (or frontal surface) S1 that is narrower than other inner sections such as S2, S3 (of the burner) of the combustion chamber. Several slides of the tool have back drafts, such as 211a, 211b, FIG. 5. At least one other slide, in this case 210a, has a draft 211c (solution with dotted lines), or even hypothetically neither a draft nor a back draft (alternative solution with a solid line for the slide 210a).

The sections (or frontal surfaces) are considered parallel to the opening 70 or transversely to the walls 16", 18"; see the examples of the sections S1, S2, S3, according to the direction in which the corresponding slide has to cross the bottleneck formed by the opening 70.

In a preferred example, as shown, at least one of the slides, in this case 210a, with a frontal section Sa smaller than the section S1 of the opening 70 (gas outlet) with one section (or frontal surface), is movable perpendicular to the plane P in which the opening 70 extends. This slide 210a, which is the first to be removed in order to be able to remove the others, is straight and extends along the axis 72. The direction 71 is parallel to this axis. The slide 210a extends from the bottom 74 of the block/tool 200 to the opening 70, or even beyond it so that it can be grasped. At the location of the frontal section S1, it is surrounded on the inside and the outside by other slides, in this case 210b, 210d, the sum of their total sections Sa+Sb+Sd being equal to the section S1.

To adapt to the annular shape of the annular combustion chamber 100 and facilitate the operation of the slides, at least some (in the example, all) of the movable slides extend in sectors, as shown in FIG. 6.

Thus, each total frontal section Sa, Sb, Sd, etc., is the sum of the frontal sections of the circumferentially adjacent sectors forming the slide in question; see, for example, the adjacent sections Sa-Sa1 and Sa-Sa2 of two circumferentially adjacent sectors 210a1, 210a2 of the slide 210a.

Despite the sectoring, it is advisable to provide for all the slides to be removed through the opening 71, since partial removal does not solve the problem of the back drafts and the passage through the opening 70.

All the more so considering the back drafts, the order of removal of the slides is fixed and predetermined.

In the example shown, once the combustion chamber 100 is formed and thus polymerised, the slide 210a is removed first, followed in order and successively by the slides 210b, 210c, 210d, 210e, 210f, 210g.

At least by orienting it in a certain way, each slide (sector) has a section that is obviously smaller than the section S1 of the opening 70, in order to be able to pass through this opening.

It is also noted that, as shown in FIGS. 5-6, the shaping tool 200 is annular, so that once formed around its slides assembled in a block, the combustion chamber 100 extends in an annular fashion about an axis X which is also that of the annular shape of the tool 200.

The following is a general indication of the technique for providing and shaping this one-piece annular part 100 around said slides 210 assembled in a block to form the shaping tool 200, specifying that it is a conventional technique for producing a part made of thermostructural composite material, such as CMC.

As is known (see Wikipedia™), the production of a composite ceramic part generally follows three steps: Depositing and fixing fibres in the desired shape for the part; Adding the ceramic matrix between the fibres; Finishing and, if need be subsequent steps, such as the addition of further layers. The first step consists of depositing and fixing fibres (also known as "rovings"), similar to the equivalent step in the production of composite polymers: for example, as in this case, depositing a fabric of fibres, drape moulding. The last step typically involves the use of conventional machining techniques: grinding, reaming, lapping or milling, or water-jet or laser cutting.

The second step can be carried out by five different methods in order for the ceramic matrix to enter between the fibres: Depositing the ceramic from a gas mixture; Creating a polymer containing Si and C atoms by pyrolysis; Creating by chemical reaction; Creating by sintering at a lower temperature (1000° C. to 1200° C.); Creating by ceramic powder electrophoresis.

In this case, it is specifically recommended to proceed as follows, in accordance with the disclosure of WO2010034937: producing a fibrous preform 110 of which the shape is consolidated by drape moulding on and around the tool 200, by impregnating the fibrous preform with a consolidating composition containing a precursor and by transforming the precursor by pyrolysis, which is then densified by chemical vapour infiltration (CVI) so as to obtain such a combustion chamber 100 with a hollow interior.

For the production of the impregnated fibrous preform 110, one or more strata of a fibrous texture, for example a three-dimensional (3D) fabric impregnated with the consolidating composition, can be used. The fibrous texture is then shaped by drape moulding on and all around the tool 200, in order to obtain a preform 110 (having a shape) corresponding to that of the part 100 to be produced (portions 16", 18" and 21", FIGS. 5 and 6). The resin of the consolidating composition is crosslinked and then pyrolysed, leaving a solid residue of carbon, or ceramic in the case of CMC, consolidating the preform. The consolidated preform is densified by a carbon or ceramic matrix obtained by CVI. In a well-known manner, densification by CVI is obtained by placing the consolidated preform in a reaction chamber and by injecting a gas reaction phase containing one or more carbon or ceramic precursors into the chamber, the conditions of pressure and temperature, in particular, in the reaction chamber being chosen to allow the gas reaction phase to diffuse inside the porosity of the preform and to form therein a solid deposit of carbon or ceramic by decomposition of one or more components of the reaction gas phase or by reaction among several components. The consolidating composition must be impregnated sufficiently to obtain the amount of solid residue after pyrolysis necessary for satisfactory consolidation. Satisfactory consolidation in this case means a partial densification of the fibrous preform 110 which reaches or slightly exceeds a threshold after which the preform retains its shape by itself and can possibly be handled once the slides 210 have been removed from the tool. It has been observed that sufficient consolidation is generally obtained with a solid residue content by volume after pyrolysis of 12% to 14% (i.e. the percentage of the apparent volume of the preform occupied by this solid residue).

Mechanical tests carried out on CMC parts thus obtained by liquid consolidation with a ceramic precursor resin and densification by CVI have yielded satisfactory results.

One embodiment of a method according to the invention will be described below in reference to FIG. 1 in the context of the production of a piece made of thermostructural composite material such as CMC.

Figure 7:
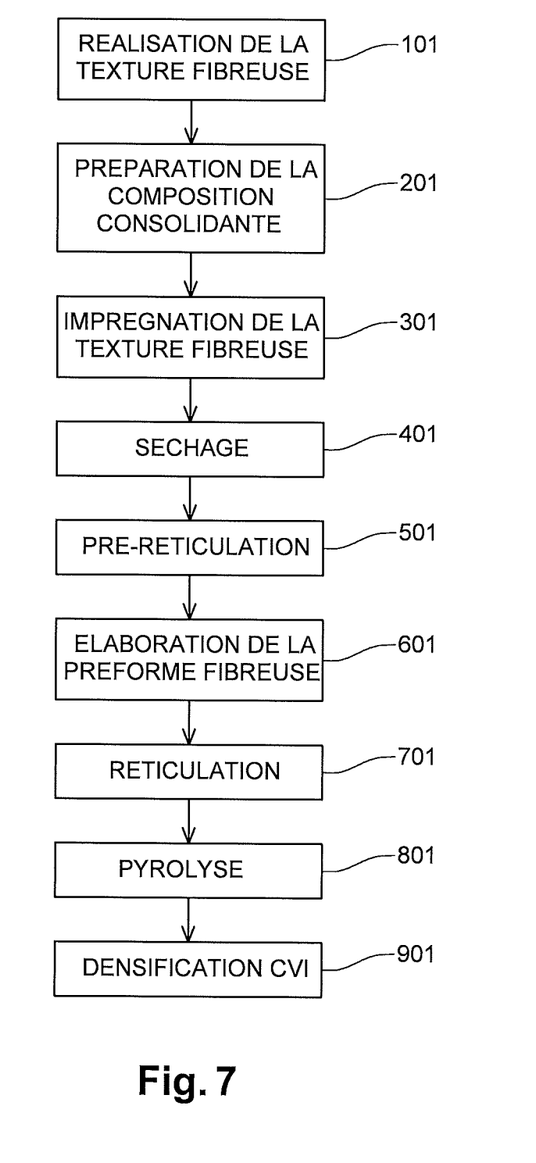
FIG. 7 shows successive steps of a method for manufacturing a part made of thermostructural composite material according to an embodiment of the invention.

To provide an even more detailed description of an embodiment, as shown schematically in FIG. 7, the steps for producing the part 100 can be as follows:

A first step 101 of the method consists of producing a fibrous texture made of carbon or ceramic fibres from which a preform of the part 100 can be produced.

The fibrous texture is formed from yarns or cords (hereinafter referred to as "yarns") made of carbon or ceramic fibres or fibres of carbon or ceramic precursor, and the precursor is then transformed into carbon or ceramic by thermal treatment after forming the fibrous texture.

The fibrous texture may be in the form of a fabric, in particular a fabric obtained by three-dimensional (3D) weaving, which makes it possible to have a relatively thick fibrous texture with several layers of yarns bonded together. Other textile processes can be used to form the fibrous texture, for example such as braiding, knitting or the formation of multi-directional sheets by superimposition in different directions and bonding sheets of unidirectional yarns together, the bonding being carried out, for example, by sewing.

A second step 201 consists of preparing a consolidating composition in liquid form, comprising a ceramic precursor, typically a resin, and solid fillers in the form of ceramic powder(s). The consolidating composition may also contain a dispersant for the solid fillers, a solvent for the resin and a solvent for the dispersant (if a common solvent is not available), the amount of solvent(s) being adjusted to grant the composition the viscosity required for impregnating the fibrous texture. Ceramic precursors, especially in resin form, are well known. Thus, a precursor resin of silicon carbide SiC can be selected from the polysiloxane resins, the polysilazane resins and the polycarbosilane resins. The solid fillers consist of one or more ceramic powders chosen, for example, from the powders of silicon carbide SiC, titanium carbide TiC, boron carbide $B_4C$ and boron nitride BN. According to one feature of the method, the particle size is chosen to be relatively small: less than 200 nanometres on average. Particle size is used herein to refer to the mean size or diameter of the powder grains. In step 301, the fibrous texture is impregnated with the consolidating composition. The respective levels of ceramic precursor and ceramic powder in the consolidating composition as well as the amount of consolidating composition injected into the texture are chosen so that, in the fibrous preform after converting the precursor into a solid ceramic residue:

the volume ratio of ceramic residue in the preform is between 3% and 10%, and the volume ratio of ceramic powder(s) in the preform is between 0.5% and 5%.

Volume ratio is used herein to refer to the occupied fraction of the total apparent volume of the preform.

The fibrous texture can be impregnated by brushing or by spreading or by immersion in a bath, optionally under vacuum, or even by injection of the consolidating composition with evacuation.

Knowing the apparent volume of the consolidated preform to be obtained and the level of solid pyrolysis residue for the ceramic precursor used, it is easy to determine the amount of precursor to be used in order to obtain a desired volume ratio of ceramic residue in the preform. Knowing the apparent volume of the consolidated preform to be obtained, it is also easy to determine the amount of ceramic powder(s) to be used in order to obtain a desired volume ratio of ceramic powder(s) in the preform. Knowing the amounts of ceramic precursor and ceramic powder(s) to be used, the amounts of possible dispersant and solvent(s) can be easily determined to ensure good dispersion of the one or more powders and to give the consolidating composition the viscosity required for impregnating the fibrous texture.

After impregnation, a drying step 401 can be carried out (removal of any solvents) followed by a step 501 of pre-crosslinking the ceramic precursor resin. Pre-crosslinking of the resin refers to bringing the resin to an intermediate state between non-crosslinked and completely crosslinked resin. The aim is to grant the fibrous texture a greater stiffness while maintaining the deformability required to be able to shape same in order to produce the preform of the part 100. This makes it possible to improve the ability of the fibrous texture to maintain its shape after deformation during its shaping, and to facilitate the possible creation of discrete bonds (sewing, implanting bonding elements); note that such pre-crosslinking may not be useful in every case.

The manufacture of the fibrous preform of said part 100 (step 601) can include cutting strata or panels in the impregnated fibrous texture and shaping same on a tool element having a shape corresponding to that of the part to be produced. It is noted that the fibrous texture can be impregnated after cutting such strata or panels.

Depending on the complexity of the shape to be given to the fibrous preform 110, the capacity for the fibrous texture to deform without generating significant irregularities in the surface and the thickness of the fibrous preform, its manufacture can include one or more of the following operations:

drape moulding (shaping) a single stratum of fibrous texture on the tool element, drape moulding several superimposed strata, not necessarily of the same dimensions when the fibrous preform has a variable thickness, cutting panels of fibrous texture and arranging the panels on the tool element with adjacent edges, possibly with mutually overlapping edges.

The bond between superimposed strata or between adjacent edges of panels of fibrous texture can be achieved by sewing or by implanting bonding elements such as yarns.

After manufacturing the fibrous texture, the crosslinking of the ceramic precursor resin is completed (step 701).

The shaping tool 200 can then be removed from the fibrous preform so that it undergoes a thermal treatment of resin pyrolysis (step 801). Such thermal treatment is usually carried out at a temperature of 700° C. to 1000° C., for one to several hours.

A fibrous preform consolidated by the ceramic residue from pyrolysis of the precursor contained in the consolidating composition is then obtained, this ceramic residue in turn being reinforced by the ceramic powder or powders. The fibrous preform 110 thus consolidated is then densified by a ceramic matrix via CVI (step 901). CVI processes for densifying a porous substrate with a ceramic matrix are generally known. Densification is advantageously performed by an at least partly self-healing ceramic matrix, i.e. one that is capable, by transforming into a paste at working temperatures, of sealing any possible cracks in the matrix. Methods for forming ceramic matrices, in particular self-healing, are described for example in U.S. Pat. Nos. 5,965,266, 6,068,930 and 6,291,058.

Since CVI densification is carried out at a temperature higher than the pyrolysis temperature of the ceramic precursor of the consolidating composition, steps 801 and 901 can be carried out in sequence in the same furnace, as pyrolysis takes place during the temperature rise prior to the beginning of CVI densification.

The amounts of carbon precursor and solid fillers in the consolidating composition are preferably chosen so that, after pyrolysis of the carbon precursor, the volume ratio of solid residue from pyrolysis of this precursor in the consolidated fibrous preform 110 is between 3% and 10%, and the volume ratio of solid fillers in the preform is between 0.5% and 5%. An interphase can be provided between the fibres of the fibrous texture and the matrix of the CMC or C/C material. The material that constitutes the interphase is, for example, pyrolytic carbon (PyC), boron nitride (BN) or boron-doped carbon (BC with, for example, 5 at. % to 20 at. % of B, the balance being C).

It is noted that the technique for manufacturing an annular combustion chamber such as 200 using thermostructural composite material makes it possible to do away with any "counter-mould" around the tool 200. Unlike in the example, there is no step of keeping the fibrous preform 110 in the desired shape on the shaping tool 200 by means of a membrane, for example made of elastomer, forming a counter mould that would be applied to the outer surface of the preform.

Thus, the combustion chamber 100 is produced on and around the single tool 200, without any other shaping part being arranged around the fibrous preform or this combustion chamber.

The invention claimed is:

1. A method for manufacturing, in a thermostructural composite material, at least a part of an combustion chamber which is annular and delimited by a bottom wall, an inner annular wall and outer an annular walls, joined together in a single piece by the bottom wall, the method comprising steps wherein:

a) a shaping tool comprising a plurality of movable slides is provided, some of said movable slides defining a surface adapted to define a support for the bottom wall to be manufactured, b) said at least a part of the combustion chamber is manufactured around the shaping tool, said at least a part of the combustion chamber manufactured having the bottom wall facing said surface defining the support and, at an end opposite the bottom wall, an opening defining a gas outlet and having a narrower section than other inner sections of said at least a part of the combustion chamber, c) then said movable slides of the shaping tool are removed from the shaping tool, in a predetermined order imposed by relative positions of the movable slides.

2. The method according to claim 1, wherein step b) comprises manufacturing a fibrous preform of which a shape is consolidated by drape moulding on and around said shaping tool by impregnating the fibrous preform with a consolidating composition containing a precursor and by transforming the precursor by pyrolysis, the fibrous preform being then densified by chemical vapour infiltration, so as to obtain said at least a part of the combustion chamber with a hollow interior.

3. The method according to claim 1, wherein several of said movable slides of the shaping tool have back drafts, and at least one other slide of said movable slides has either a draft or neither a draft nor a back draft.

4. The method according to claim 3, wherein the predetermined order of step c) is imposed by the back drafts.

5. The method according to claim 2, wherein:
the fibrous preform manufactured is made of yarns or cords,
and the precursor of the consolidating composition is a carbon or ceramic precursor.

6. The method according to claim 1, wherein the step of removing said movable slides from the hollow interior of said at least a part of the combustion chamber comprises an outward movement of the movable slides through the opening of said at least a part of the combustion chamber.

7. The method according to claim 1, wherein at least some of the movable slides, including said some of the movable slides defining the surface adapted to define the support, extend by sectors about an axis around which said at least a part of the combustion chamber extends, annularly.

8. The method according to claim 1, wherein:
several of said movable slides of the shaping tool have back drafts, and at least one other side of said movable slides has either a draft or neither a draft nor a back draft,
the step of removing said movable slides from the hollow interior comprises an outward movement of the movable slides through the opening of said at least a part of the combustion chamber,
said movable slides with back drafts are sectored, and
during the step of removing said movable slides from the hollow interior of said at least a part of the combustion chamber, all the movable slides move through the opening of said at least a part of the combustion chamber.

9. The method according to claim 1, wherein at least one of said movable slides
has a section smaller than a section of said opening,
extends in a straight line along an axis parallel to an axis of said at least a part of the combustion chamber, and is movable perpendicular to a plane in which the opening extends.

10. The method according to claim 8, wherein said at least one of said movable slides extends:
   from said surface adapted to define a support for the bottom wall to be manufactured,
   up to the opening.

11. The method according to claim 9, wherein said at least one of said movable slides is the first of said movable slides to be removed in step c).

12. The method according to claim 1, wherein said shaping tool is made of metal.

13. The method according to claim 1, wherein the thermostructural composite material is CMC.

14. The method according to claim 1, wherein said at least a part of the combustion chamber is manufactured on and around the shaping tool only, without any other shaping part being arranged around the fibrous preform or said at least a part of the combustion chamber.

15. A method for manufacturing, in a thermostructural composite material, at least a part of an annular combustion chamber having a furnace within which a combustion can occur and which is delimited in a single piece by a bottom wall, an inner annular wall and an outer annular wall, the bottom wall having ports therethrough, said ports being adapted to be supplied with oxidant and fuel for the furnace, the method comprising steps wherein:
   a) a shaping tool comprising a plurality of movable slides is provided, some of said movable slides defining a surface adapted to define a support for the bottom wall to be manufactured,
   b) said at least a part of the combustion chamber is manufactured around the shaping tool, including the inner annular wall, the outer annular wall, the bottom wall and the furnace, said bottom wall facing said surface defining the support, a portion of which defines a periphery around each port, and, at an end opposite the bottom wall, an opening defining a gas outlet and having a narrower section than other inner sections of said at least a part of the combustion chamber,
   c) then said movable slides of the shaping tool are removed from the furnace, in a predetermined order imposed by relative positions of the movable slides.

16. The method according to claim 15, wherein at least some of the movable slides, including said some of the movable slides defining the surface adapted to define the support, extend by sectors about an axis around which said at least a part of the combustion chamber extends, annularly.

17. The method according to claim 16, wherein:
   several of said movable slides have back drafts, and at least one other movable slide of said movable slides has either a draft or neither a draft nor a back draft,
   the step of removing said movable slides from the hollow interior comprises an outward movement of the movable slides through the opening of said at least a part of the combustion chamber,
   said movable slides with back drafts are sectored, and
   during the step of removing said movable slides from the hollow interior of said at least a part of the combustion chamber, all the movable slides move through the opening of said at least a part of the combustion chamber.

18. The method according to claim 15, wherein:
   several of said movable slides have back drafts, and at least one other slide of said movable slides has either a draft or neither a draft nor a back draft,
   the step of removing said movable slides comprises an outward movement of the movable slides through the opening,
   said movable slides having back drafts are sectored,
   during the step of removing said movable slides, all the movable slides move through the opening, and
   said at least one of said movable slides extends from said surface adapted to define a support for the bottom wall to be manufactured up to the opening.

* * * * *